(12) United States Patent
Meeks et al.

(10) Patent No.: US 7,281,471 B2
(45) Date of Patent: Oct. 16, 2007

(54) COTTON HARVESTER COMPACTING CHAMBER WITH WALLS WHICH TAPER DIVERGENTLY TOWARD A COTTON UNLOADING OPENING

(75) Inventors: Timothy A. Meeks, Davenport, IA (US); Michael J. Covington, Bettendorf, IA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/093,137

(22) Filed: Mar. 29, 2005

(65) Prior Publication Data
US 2005/0211112 A1 Sep. 29, 2005

Related U.S. Application Data

(60) Provisional application No. 60/557,627, filed on Mar. 29, 2004.

(51) Int. Cl.
*B30B 1/00* (2006.01)
*A01D 46/08* (2006.01)

(52) U.S. Cl. .................. 100/226; 100/178; 100/229 A; 56/28

(58) Field of Classification Search ............... 100/177, 100/179, 191, 214, 215, 218, 226, 229 A, 100/240, 245, 295, 100, 229 R, 178; 56/28, 56/341, 344, 16.4 B; 460/119
See application file for complete search history.

(56) References Cited

U.S. PATENT DOCUMENTS

| | | | |
|---|---|---|---|
| 391,263 A | 4/1888 | Liddell | |
| 1,126,073 A * | 1/1915 | Peterson et al. | 100/228 |
| 2,572,180 A | 10/1951 | Morrison | 198/223 |
| 3,101,581 A | 8/1963 | Kelso | 56/28 |
| 3,250,114 A | 5/1966 | Pioch | 214/302 |
| 3,724,713 A | 4/1973 | Coren | 220/71 |
| 3,807,590 A * | 4/1974 | Jones et al. | 414/809 |
| 4,127,061 A | 11/1978 | Husky | 100/100 |
| 4,344,272 A | 8/1982 | Gaudette et al. | 56/16.6 |
| 4,370,848 A | 2/1983 | Campbell et al. | 56/341 |
| 4,450,764 A * | 5/1984 | Montgomery | 100/37 |
| 4,635,544 A | 1/1987 | Taylor | 100/98 R |
| 5,616,077 A * | 4/1997 | Covington et al. | 460/119 |
| 6,536,197 B1 | 3/2003 | Covington et al. | 56/28 |
| 2004/0103630 A1* | 6/2004 | Kitchen | 56/13.1 |

* cited by examiner

*Primary Examiner*—Jimmy Nguyen
(74) *Attorney, Agent, or Firm*—Michael G. Harms; John William Stader; Patrick M. Sheldrake

(57) ABSTRACT

A cotton receiver of a cotton harvesting machine including a floor and opposing side walls defining a cotton compacting chamber, each of the side walls including a plurality of spaced apart perforations therethrough for passage of air from the chamber, and a door enclosing an end of the chamber. The receiver includes compacting apparatus for compacting cotton into a compacted body which will have a sideward shape and extent at least generally defined by the opposing side walls, the door being openable to allow removal of a compacted body of cotton from the chamber through the end. The opposing walls are tapered divergingly toward the end such that when a compacted body is removed from the chamber through the end, cotton protruding into the perforations will be released.

12 Claims, 3 Drawing Sheets

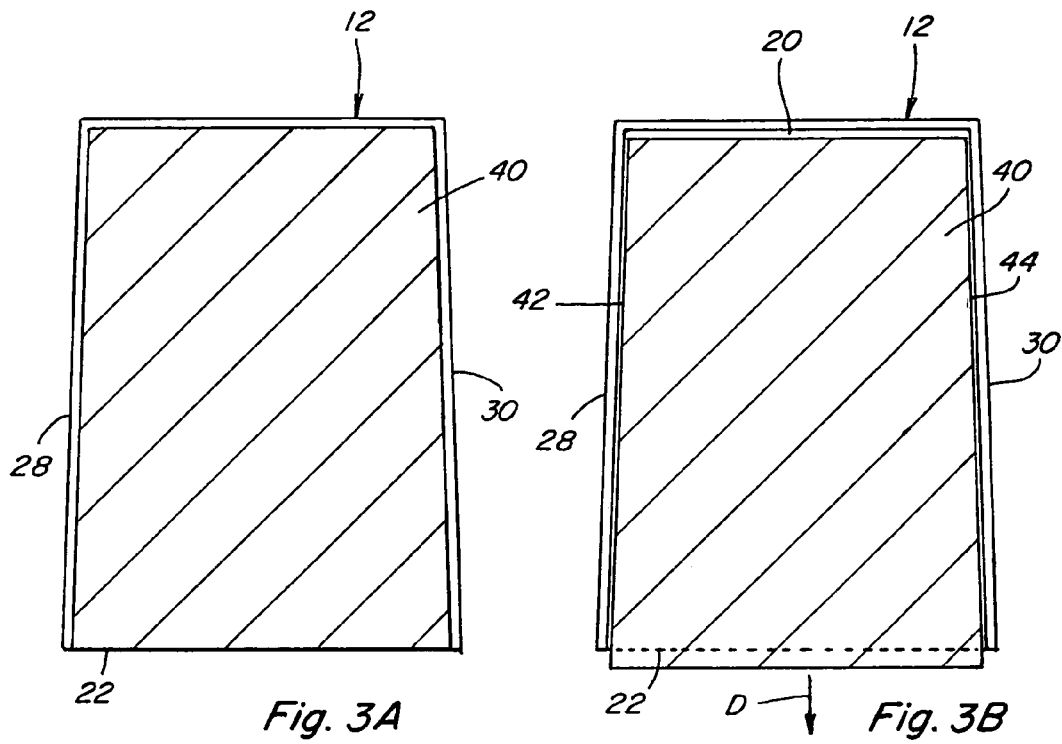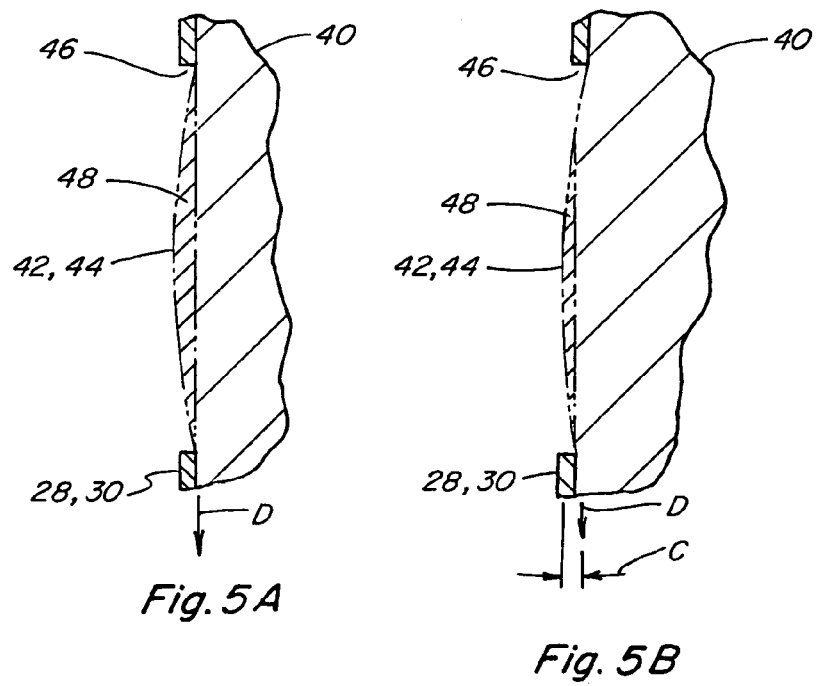

COTTON HARVESTER COMPACTING CHAMBER WITH WALLS WHICH TAPER DIVERGENTLY TOWARD A COTTON UNLOADING OPENING

This application claims the benefit of U.S. Provisional Application No. 60/557,627, filed Mar. 29, 2004.

TECHNICAL FIELD

This invention relates generally to a cotton compacting chamber for a cotton harvesting machines, and more particularly, to a cotton compacting chamber having opposing side walls which taper divergently toward an end which opens for unloading compacted cotton from the chamber.

BACKGROUND ART

Cotton harvesting machines commonly now include an on-board cotton compacting or packaging chamber in which harvested cotton is collected and compacted by compacting apparatus into a unitary mass or module. Such compacted cotton modules are desirably sufficiently compacted so as to retain their compacted shape when removed from the compacting chamber for ease of handling and other purposes. The compaction of the cotton to achieve this capability presents a problem in that it makes the cotton more difficult to unload or remove from the cotton compacting chamber. A factor that can increase this problem is that many of the cotton compacting chambers have side walls which include openings or perforations to allow air used to convey the cotton into the compacting chamber to escape. During the compaction process, the cotton is forced against the walls and partially into the openings or performations, such that when movement of the unitary mass or module of compacted cotton is attempted in a direction closely parallel to the abutting surface of the side wall, significant resistance can be encountered. This problem is particularly increased under certain crop conditions and yields which result in the cotton being compacted very tightly. Typically, cotton conveyors such as chains or a moving floor are utilized for conveying the cotton from the chamber when unloading, and the friction and protrusion of cotton into any side wall openings and/or perforations can present or significantly inhibit unloading of the cotton from the chamber.

As a result, what is sought is a cotton compacting chamber side well configuration or construction which overcomes one or more of the problems set forth above.

SUMMARY OF THE INVENTION

What is disclosed is a cotton compacting chamber configuration and construction for a cotton harvesting machine, which overcomes at least one of the problems set forth above. According to a preferred aspect of the invention, the cotton compacting chamber includes a first or unloading end, and an opposite enclosed second end. A floor defines the bottom of the chamber and extends between the ends, and side walls extend upwardly from the floor in opposing relation between the opposite ends. A door encloses the first end and is operable for unloading the cotton from the chamber. An end wall extends upwardly from the floor between the side walls at the second end of the chamber. Compacting apparatus is disposed above or in an upper region of the chamber and is movable downwardly into the chamber under pressure for compacting any cotton in the chamber into a compacted mass or module having a shape and extent defined by the opposing side walls, end wall and door.

In operation, the picked cotton is conveyed by air flows from cotton picker units of the harvesting machine through ducts into the upper region of the chamber. The cumulative air flow into the chamber is voluminous, and to allow the air to escape while retaining the cotton in the chamber, at least the side walls include a plurality of openings or perforations therethrough sufficient in size and number for the air from the air flows to escape and dissipate, while retaining and holding the cotton.

Importantly, the side walls are tapered divergently or outwardly toward the first end and door of the chamber, such that when the door is open and a drag chain or chains or other conveying elements on the floor are actuated to move the compacted cotton over the floor and through the door, such movement will not be impeded or resisted by the contact between the cotton and the side walls to such an extent as to prevent or inhibit the unloading. A rate or angle of taper between about ¼° and about 5° can be utilized. The side walls can optionally be tapered also so as to extend convergingly toward the upper regions of the compacting chamber.

As a result of the divergent taper toward the open end of the chamber, any cotton that is forced into or protrudes into the openings or perforations through the side walls will be easily extracted or removed therefrom for relatively smooth passage of the compacted cotton along the side walls, without significant amounts of the cotton being retained in the openings or perforations, and/or tearing of the compacted mass or module.

BRIEF DESCRIPTION OF THE DRAWINGS

FIG. 3A is a simplified schematic top view of the chamber showing a compacted body of cotton therein;

FIG. 3B is another simplified schematic top view of the chamber, showing removal of the compacted body of cotton through an open end thereof;

FIG. 5A is an illustration sectional representation of the side wall portion of FIG. 4 illustrating compacted cotton protruding into one of the openings; and FIG. 5B is another fragmentary sectional representation of the side wall portion of FIG. 4 oriented at the taper and illustrating the effect of the taper on removal of the body of cotton from the chamber.

DETAILED DESCRIPTION OF THE INVENTION

A representative conventional cotton harvesting machine 10 is shown, including a cotton compacting structure 12 for receiving and holding cotton harvested by a plurality of picker units 14 arrayed across a forward end of machine 10. The cotton is conveyed from picker units 14 through a plurality of parallel ducts 16 by air flows through the ducts, which air flows are dissipated as will be explained.

Figure 1:
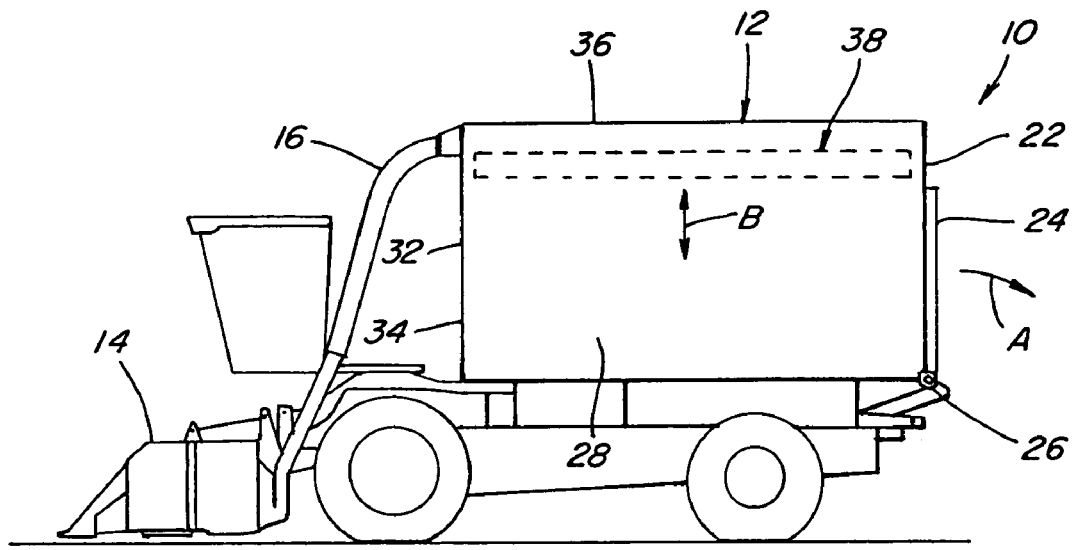
FIG. 1 is a simplified side view of a representative cotton harvesting machine including a cotton compacting chamber constructed and configured according to the present invention.
Figure 2:
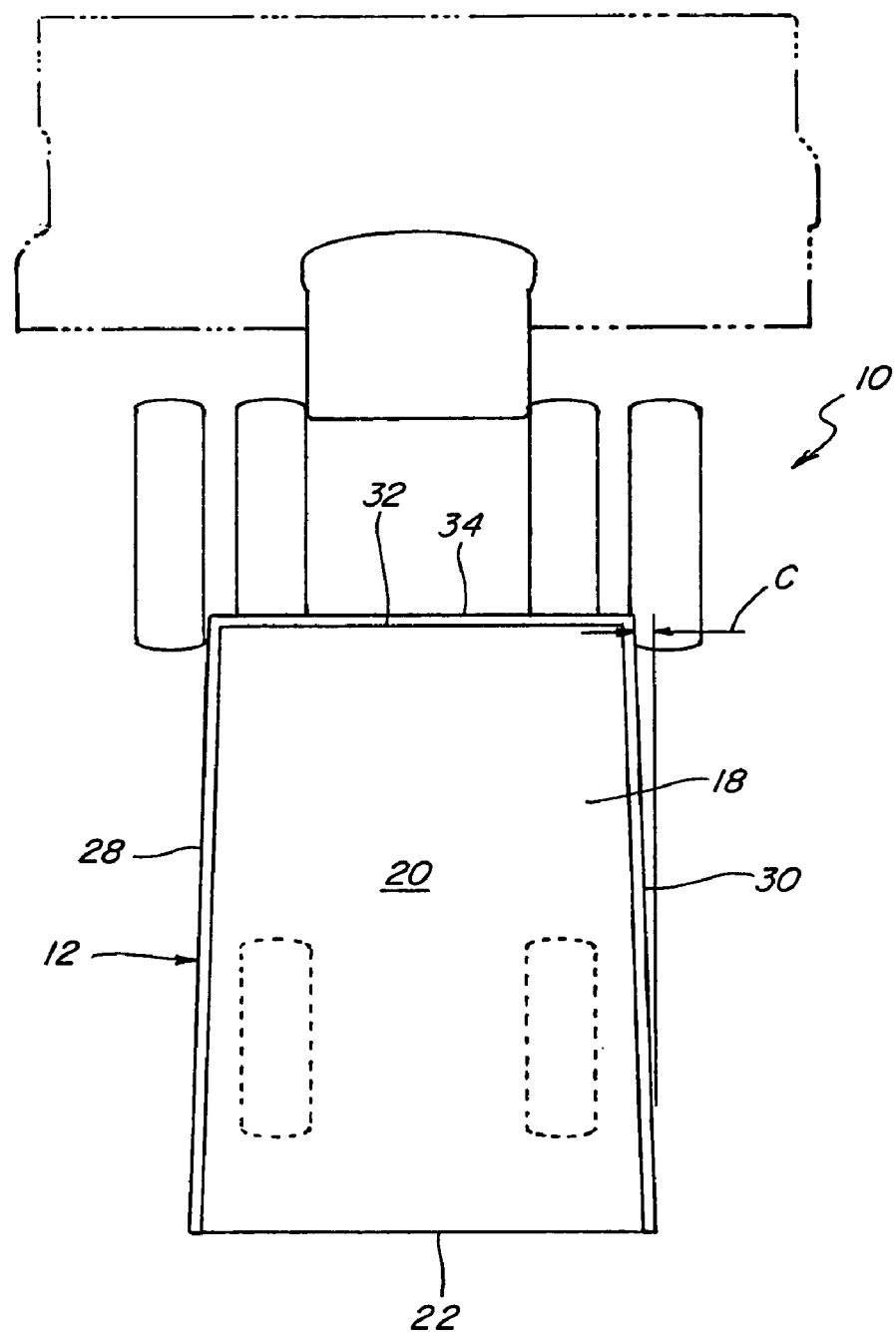
FIG. 2 is a simplified schematic top view of the machine of FIG. 1, with a top portion of the cotton compacting chamber removed to show an exaggerated taper of the side walls thereof.

Referring to FIG. 2, compacting structure 12 of machine 10 includes a floor 18 which defines the bottom of a cotton compacting chamber 20. Chamber 20 includes a first end 22 enclosable by a door 24 (FIG. 1) which is pivotally mounted at a pivot 26 for movement in a direction A to an open position to allow unloading of cotton from chamber 20. A pair of opposing side walls 28 and 30 extend upwardly from floor 18 on opposite sides of chamber 20 between first end 22, and an opposite second end 32 enclosed by an end wall 34. An upper portion of chamber 20 is enclosed by a roof 36, and contains compacting apparatus 38 supported for upward and downward movement, as denoted by arrow B, for compacting cotton in chamber 20 against floor 18, door 24, side walls 28 and 30, and end wall 34, in the well known manner.

Referring more particularly to FIG. 2, and also to FIGS. 3A and 3B, side walls 28 and 30 are each tapered so as to extend divergently along the lengths thereof from second end 32 to first end 22. The angle of the taper of each wall can be within a range of from about ¼° to about 5°, as illustrated by angle of taper C of wall 30, and is preferably about ½°. Here, it should be noted that for purposes of illustration only, angle C of the walls is shown as exaggerated. In FIG. 3A, a compacted body of cotton 40 is shown compacted in an abutting relation against side walls 28 and 30, as representative of cotton compacted in the well known customary manner by apparatus such as compacting apparatus 38. In FIG. 3B, body of cotton 40 is shown partially removed from chamber 20 through open first end 22, as denoted by arrows D. This can be accomplished in the customary manner, by well known conveying elements (not shown) on floor 18, which can include, but are not limited to, one or more drag chains or the like. Here, it can be observed that sides 42 and 44 of body of cotton 40 have been cleanly separated or released from side walls 28 and 30, as effected by angle of taper C of both walls. As a result, further movement of body of cotton 40 by the conveying elements in the direction D will result in complete removal of body of cotton 40 from chamber 28. Side walls 28 and 30 can be smooth, and/or can include a coating or layer of a low friction material, such as, but not limited to, a teflon coating, paint or layer, or a coating of another low friction plastics material, or the like. Alternatively, side walls 28 and 30 can include a wide variety of openings or perforations therethrough to allow the escape of the air from the air flows directed into chamber 20 through ducts 16, while retaining the cotton in the chamber.

Figure 4:
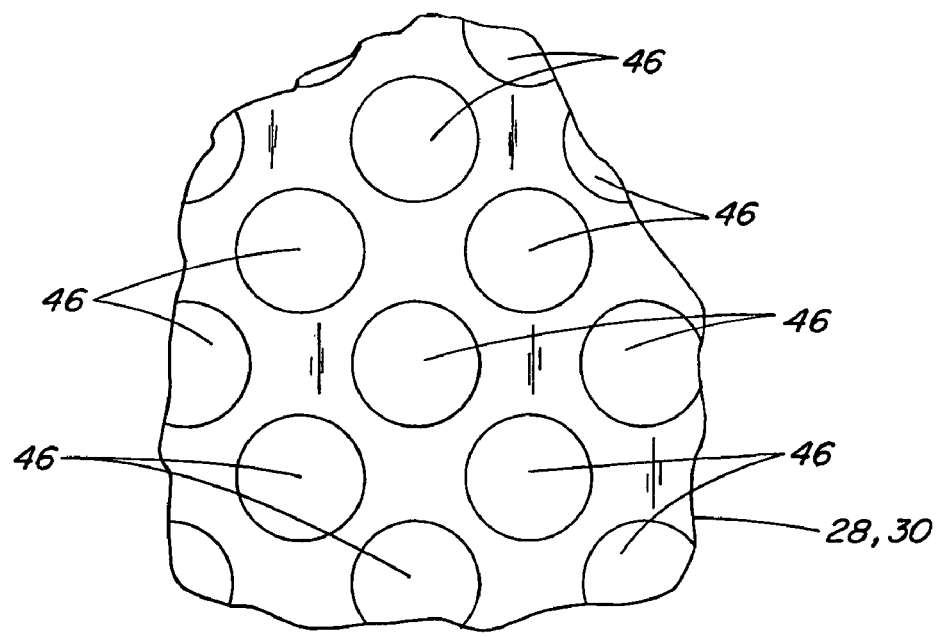
FIG. 4 is an enlarged fragmentary side view of a portion of a side wall of the chamber showing openings therethrough.

Referring also to FIGS. 4, 5A and 5B, one preferred embodiment for side walls 28 and 30 is shown, including a plurality of openings 46 therethrough at uniformly spaced intervals. Openings 46 are highly desirable, as they allow air to escape from chamber 20 at virtually any location adjacent side walls 28 and 30, which is advantageous for more evenly distributing the cotton over the floor of the chamber. However, referring more particularly to FIG. 5A, due to the compaction of the cotton, sides 42 and 44 of body of cotton 40 can extend or protrude into openings 46, as illustrated by more densely shaded protuberance 48. If body of cotton 40 were then removed from the cotton compacting chamber in a direction D parallel to side walls 42 or 44, the multiple protuberances 48 of the cotton could sufficiently inhibit or prevent removal thereof from openings 46, such that body of cotton 40 could not be removed from the chamber by the conventional conveying elements. In FIG. 5B, it can be seen that by orienting side walls 28 and 30 at the angle of taper C from the direction of movement D, protuberances 48 will be more easily released from openings 46, to allow the passage of body of cotton 40 from the chamber, without significant tearing of the cotton, or retention of cotton in openings 46.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A cotton receiving and compacting structure on a cotton harvesting machine, comprising:

a floor and opposing side walls extending upwardly from opposite peripheral edges of the floor defining a cotton compacting chamber having opposite first and second ends, wherein the side walls have an inner surface facing the chamber and an outer surface, the first end being enclosed by a door openable for unloading cotton from the chamber in a first direction generally parallel to the side walls, and the second end being enclosed by an end wall;

the compacting chamber is divergently tapered toward the door a compacting apparatus disposed above or in an upper region of the chamber and movable downwardly into the chamber for compacting cotton therein into a compacted body having a shape and an extent defined by the opposing side walls, each of the side walls including a plurality of circular openings therethrough and into which cotton can be compacted the compacted cotton in the circular openings forming protuberances extending in a second direction which is generally perpendicular to the side walls, wherein a cross-sectional view of each said circular openings taken along a horizontal plane substantially parallel to the floor, defines that each of said circular openings has an upstream edge and a downstream edge wherein the upstream edge is substantially parallel to the downstream edge, further wherein the upstream and downstream edges are substantially perpendicular to the inner and outer surfaces of the side walls; and wherein the side walls are tapered divergingly toward the first end of the chamber, so that the downstream edge of each of the circular openings is outwardly sidewards with respect to the upstream edge such that when a compacted body of cotton is removed from the chamber in the first direction, the protuberances are removed from the circular openings in the first direction while passing the downstream edges without retention of the protuberances in the circular openings.

2. The cotton receiving and compacting structure of claim 1, wherein the side walls are each tapered at an angle of between about ¼° and about 5°.

3. The cotton receiving and compacting structure of claim 2, wherein the side walls are tapered at an angle of about ½°.

4. The cotton receiving and compacting structure of claim 1, wherein circular openings are spaced at uniform locations on the side walls.

5. A cotton receiver of a cotton harvesting machine, comprising:

a floor, at least a pair of opposing side walls extending upwardly from peripheral edges of the floor defining a cotton compacting chamber therebetween, wherein the side walls have an inner surface facing the chamber and an outer surface, each of the side walls including an array of spaced apart perforations therethrough, wherein the chamber has opposite first and second ends the chamber is divergently tapered toward the first end, and wherein a door encloses the first end of the chamber;

a compacting apparatus disposed in an upper region of the chamber for movement downwardly into the chamber for compacting cotton therein into a compacted body having a sideward shape and an extent at least generally defined by the opposing side walls, each of the side walls including a plurality of circular openings therethrough and into which cotton can be compacted, the compacted cotton in the circular openings forming protuberances extending in a second direction which is generally perpendicular to the side walls the door being openable to allow removal of a compacted body of cotton from the chamber through the first end, wherein a cross-sectional view of each said circular openings taken along a horizontal plane substantially parallel to the floor, defines that each of said circular openings has an upstream edge and a downstream edge wherein the upstream edge is substantially parallel to the downstream edge, further wherein the upstream and downstream edges are substantially perpendicular to the inner and outer surfaces of the side walls; continuous side walls, and the opposing side walls being tapered diverging toward the first end, so that the downstream edge of each of the circular openings is outwardly sidewards with respect to the upstream edge such that when a compacted body of cotton is removed from the chamber through the first end, the protuberances are removed from the circular openings in the first direction while passing the downstream edges without retention of the protuberances in the circular opening from the be released.

6. The cotton receiver of claim 5, wherein the side walls are each tapered at an angle of between about ¼° and about 5°.

7. The cotton receiver of claim 6, wherein the side walls are tapered at an angle of about ½°.

8. The cotton receiver of claim 5, wherein the circular openings are spaced at uniform locations on the side walls.

9. A cotton receiver of a cotton harvesting machine, comprising:

a floor, at least a pair of opposing side walls extending upwardly from opposite peripheral edges of the floor defining a cotton compacting chamber therebetween, wherein the side walls have an inner surface facing the chamber and an outer surface, wherein the chamber has opposite first and second ends, the chamber is divergently tapered toward the first end, and wherein a door encloses the first end of the chamber;

a compacting apparatus disposed in an upper region of the chamber for movement downwardly into the chamber for compacting cotton therein into a compacted body having a sideward shape and an extent at least generally defined by the opposing side walls, each of the side walls including a plurality of circular openings therethrough and into which cotton can be compacted the compacted cotton in the circular openings, forming protuberances extending in a second direction which is generally perpendicular to the side walls, the door being openable to allow removal of a compacted body of cotton from the chamber through the first end, wherein a cross-sectional view of each said circular openings taken along a horizontal plane substantially parallel to the floor, defines that each of said circular openings has an upstream edge and a downstream edge wherein the upstream edge is substantially parallel to the downstream edge, further wherein the upstream and downstream edges are substantially perpendicular to the inner and outer surfaces of the side walls, wherein the first end portion is closer to the first; and the opposing side walls being tapered divergingly toward the first end, so that the downstream edge of each the circular openings is outwardly sidewards with respect to the upstream edge such that when a compacted body of cotton is removed from the chamber through the first end the protuberances are removed from the circular openings in the first direction while passing the downstream edges without retention of the protuberances in the circular opening.

10. The cotton receiver of claim 9, wherein the side walls are each tapered at an angle of between about ¼° and about 5°.

11. The cotton receiver of claim 10, wherein the side walls are tapered at an angle of about ½°.

12. The cotton receiver of claim 9, wherein the circular openings are disposed at uniformly spaced locations through the side walls.

* * * * *